(12) United States Patent
Yarkosky

(10) Patent No.: US 7,035,587 B1
(45) Date of Patent: Apr. 25, 2006

(54) METHOD AND SYSTEM FOR DECREASING NOISE FROM WIRELESS REPEATERS

(75) Inventor: Mark L. Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 527 days.

(21) Appl. No.: 10/222,015

(22) Filed: Aug. 14, 2002

Related U.S. Application Data

(63) Continuation of application No. 10/097,415, filed on Mar. 14, 2002.

(51) Int. Cl.
*H04B 7/185* (2006.01)

(52) U.S. Cl. .................. 455/13.4; 455/11.1; 455/9; 455/421; 455/25

(58) Field of Classification Search .............. 455/9, 455/11.1, 13.4, 25, 421
See application file for complete search history.

(56) References Cited

U.S. PATENT DOCUMENTS

| | | | |
|---|---|---|---|
| 4,996,715 A * | 2/1991 | Marui et al. ............. | 455/421 |
| 5,634,191 A | 5/1997 | Beasley | |
| 5,767,778 A | 6/1998 | Stone et al. | |
| 5,832,365 A | 11/1998 | Chen et al. | |
| 5,937,332 A | 8/1999 | Karabinis | |
| 6,125,279 A * | 9/2000 | Hyziak et al. ............. | 455/445 |
| 6,141,531 A | 10/2000 | Williams et al. | |
| 6,219,540 B1 | 4/2001 | Besharat et al. | |
| 6,404,775 B1 * | 6/2002 | Leslie et al. ............... | 370/466 |
| 6,493,537 B1 * | 12/2002 | Ogawa ......................... | 455/9 |
| 2002/0068534 A1 | 6/2002 | Ue et al. | |
| 2003/0119460 A1 | 6/2003 | Zipper | |

OTHER PUBLICATIONS

Wan Choi, et al., "Automatic On-Off Switching Repeater for DS/CDMA Reverse Link Capacity Improvement," *IEEE Communications Letters*, vol. 5, No. 4, Apr. 2001, pp. 138-141.
Office Action from U.S. Appl. No. 10/097,415, dated Jun. 21, 2004.

\* cited by examiner

*Primary Examiner*—Quochien B. Vuong
*Assistant Examiner*—Minh D. Dao

(57) ABSTRACT

A wireless signal repeater that cuts off output transmission when the repeater is receiving less than a threshold level of input signal strength (e.g., too low or nonexistent). When operated in the reverse link of a cellular wireless system, the repeater advantageously reduces transmission of noise toward a cellular base station when the repeater is receiving no (or insufficient) signal from the a mobile station. Similarly, when operated in the forward link direction of a cellular wireless system, the repeater advantageously reduces transmission of noise toward a mobile station when the repeater is receiving no (or insufficient) signal from a base station.

18 Claims, 4 Drawing Sheets

METHOD AND SYSTEM FOR DECREASING NOISE FROM WIRELESS REPEATERS

REFERENCE TO RELATED APPLICATION

This is a continuation of U.S. patent application Ser. No. 10/097,415, filed on Mar. 14, 2002.

BACKGROUND

1. Field of the Invention

The present invention relates to wireless communications and, more particularly, to wireless signal repeaters. Such repeaters can be usefully employed to enhance wireless communications of various types. For purposes of example, this description will focus mainly on cellular wireless communications, such as CDMA communications for instance.

2. Description of Related Art

Cellular wireless is an increasingly popular means of personal communication in the modern world. People are using cellular wireless networks for the exchange of voice and data over cellular telephones, personal digital assistants (PDAs), cellular telephone modems, and other devices. In principle, a user can seek information over the Internet or call anyone over a public switched telephone network (PSTN) from any place inside the coverage area of the cellular wireless network.

In a typical cellular wireless system, an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch (e.g., mobile switching center (MSC)) or gateway (e.g., packet data serving node (PDSN)) that provides connectivity with a transport network such as the PSTN or the Internet.

When a mobile station (such as a cellular telephone, pager, or appropriately equipped portable computer, for instance) (MS) is positioned in a cell, the MS and BTS can communicate with each other in various channels over the RF air interface. Communications from the BTS to an MS are considered to be in a "forward" direction, so the air interface channels used to carry such communications are referred to as the "forward link" channels. Conversely, communications from an MS to the BTS are considered to be in a "reverse" direction, so the air interface channels used to carry such communications are referred to as "reverse link" channels.

With the continued growth in popularity of wireless communications, people are increasingly engaging in cellular wireless communications in place of traditional landline communications. This is of course most notable within buildings, such as homes and offices, where landline communications, such as traditional telephone and computer networks, were once the only method available. Use of mobile stations instead of fixed landline terminals conveniently allows for free movement within such buildings as well as into and out of the buildings.

Unfortunately, however, cellular wireless communications can suffer from varying levels of signal degradation as signals are carried over the air interface between the mobile station and the base station. Most significantly, for instance, the strength of signals transmitted in the forward link direction from the base station to the mobile station can diminish substantially as the signals travel over increased distance to the mobile station. Further, obstructions such as buildings and foliage can attenuate or otherwise degrade signals passing over the air interface.

When a mobile station operates within a building, the problem can be even more acute, as the structure of the building can further diminish the signal. In a worst case scenario, forward link signals that ultimately arrive at a mobile station within a building may be too weak to be detected and/or used by the mobile station. As a result, service could be unavailable and wireless communications could be blocked or dropped. This is clearly a problem for cellular wireless carriers who are seeking to promote in-building use of their service.

One approach that can be used to overcome this difficulty is to increase the power transmitted by the base station. A disadvantage with this approach, however, is that the increased power can lead to increased interference in adjacent cells. This, in turn, can decrease the capacity of the wireless network. The power increase can also interfere with other wireless devices in use around the base station. The magnitude of the power increase proportionally affects the amount of interference produced by the base station, with a greater power increase causing a greater interference.

Also, this approach would only solve half of the problem. Increasing the signal strength from the base station would allow a mobile unit to receive the base station's signal in areas that highly attenuate that signal. It would not aid the base station in receiving a signal from a mobile station. Cellular service is primarily a bi-directional mode of communication, in which connections are established and maintained through control signals that are sent both directions between the base station and a mobile station. Therefore, in order to support bi-directional communication, an increase in the transmission power of the base station would require a corresponding increase in the transmission power of the mobile station.

Another approach to help increase wireless signal strength within a building is to provide a distributed antenna system in the building. In this approach, a hub is connected, via wired links, to one or more wireless access points in the building. The wired link is typically a coaxial cable, a 10Base-T cable, or a fiber optic cable. The hub transmits the RF signals from the base station to the wireless access points, via the wired links. The wireless access points, in turn, transmit the RF signals into the building, where they may be received by mobile stations. Similarly, the wireless access points receive RF transmitted by the mobile stations and transmit the RF to the hub, via the wired links. The hub, in turn, transmits the RF to the base station. In this way, the wireless coverage area provided by the base station may be enhanced within the building.

A disadvantage with this latter approach, however, is that cabling is often difficult and expensive to install. This is especially true in buildings where cabling may have to be installed inside walls or in other difficult to access areas. Further, another disadvantage with this approach is its inflexibility resulting from the use of dedicated wired connections. In particular, a wired network is not easy to reconfigure, as additional cabling must be installed.

SUMMARY

As presently contemplated, wireless signal quality in buildings and elsewhere can be improved by employing a portable wireless signal repeater to receive, boost and re-transmit communication signals that are being sent between a base station and a mobile station (or, for that matter, between any sort of wireless access point and a mobile station). In this regard, the wireless signal repeater can operate simultaneously to boost signals on both the forward link (from base station to mobile station) and the reverse link (from mobile station to base station).

In accordance with an exemplary embodiment of the present invention, the wireless repeater will advantageously include a mechanism to help a user easily determine if the repeater is well positioned, or more particularly to help a user determine how well the repeater is functioning. In particular, the repeater will preferably include an integrated display screen that presents the user with various combinations of (i) a receive signal level, (ii) a transmit signal level, and (iii) a textual indication of signal quality, reflecting in text (e.g., one or more words) how well the repeater is functioning to repeat wireless signals.

By simply referring to the display screen, a user can thus readily determine whether the repeater is functioning adequately to boost wireless signal strength. And if the repeater is not functioning as desired, the user can then simply move the repeater around until the display screen reflects acceptable or normal performance. In this manner, the user can easily optimize the performance of the repeater so as to improve the quality of wireless communications.

By way of example, when the repeater is receiving a signal of acceptable signal strength (not too high and not too low) and the repeater is able to amplify and transmit the signal without producing feedback oscillation, the receive level may indicate a respective input signal strength, the transmit level may indicate a respective output signal strength, and the textual indication of signal quality may read "NORMAL" or the like. This could then indicate to the user that the repeater is functioning normally to receive, build out and transmit wireless signals.

As another example, when the repeater is receiving a signal of insufficient signal strength (less than some defined threshold, or perhaps altogether nonexistent) so that the repeater is not able to amplify and output a signal, the receive level may indicate insufficient/no receive signal, the transmit level may indicate insufficient/no transmit signal, and the textual indication of signal quality may read "NO SIGNAL" or the like. Advantageously, this could then indicate to the user that the repeater is not functioning properly in its current location. In response, the user can then conveniently move the repeater around until the display screen reflects adequate RF operation.

As yet another example, when the repeater is receiving a signal that is weak but sufficient to be amplified and output, the receive level may indicate low or weak input signal strength, the transmit level may indicate a respective output signal strength, and the textual indication of signal quality may read "WEAK SIGNAL" or the like. Advantageously, this could indicate to the user that the repeater is functioning alright but not as well as it could. In response, the user can then conveniently move the repeater around until the display screen reflects better RF operation.

And as still another example, when the repeater is receiving a signal that exceeds a defined threshold of signal strength (such as a maximum level for safe operation of the repeater) or that the repeater cannot amplify and transmit without encountering feedback oscillation, the receive level may indicate full input signal strength, the transmit level may indicate unacceptable/no transmit signal, and the textual indication of signal quality may read "SIGNAL TOO STRONG" or the like. Advantageously, this could then indicate to the user that the repeater is not functioning properly in its currently location. And in response, the user can then conveniently move the repeater around until the display screen reflects adequate RF operation.

Thus, in one respect, an exemplary embodiment of the invention can take the form of a wireless signal repeater that receives, amplifies and transmits a wireless signal and that includes an integrated display screen that provides a textual explanation of how well the repeater is currently functioning to repeat wireless signals.

And in another respect, an exemplary embodiment of the invention can take the form of a wireless signal repeater that receives, amplifies and transmits a wireless signal and that includes an integrated display screen that provides concurrent indications of (i) receive signal level and (ii) transmit signal level. Further, the integrated display screen may also concurrently display a textual indication of wireless signal quality reflecting an extent to which the wireless signal repeater is operable to repeat wireless signals.

In yet another respect, an exemplary embodiment may take the form of a wireless signal repeater that includes, in a single device (e.g., in one housing), (i) a wireless signal input circuit that receives a wireless input signal (an RF signal) and produces a first signal (a current) reflecting the wireless input signal, (ii) a build-out circuit for amplifying the first signal so as to produce a second signal, (iii) a wireless signal output circuit that receives the second signal and transmits a wireless output signal reflecting the second signal, (iv) a controller, and (v) a display screen.

In this embodiment, the controller may cause to be displayed on the display screen, at once, an input-signal-indicator reflecting an input signal level on the wireless signal input circuit, and an output-signal-indicator reflecting an output signal level on the wireless signal output circuit. Further, the controller may cause to be displayed, concurrently with the input-signal-indicator and the output-signal-indicator, a textual indication of wireless signal quality, reflecting an extent to which the wireless signal repeater is operable to repeat wireless signals.

And in still another respect, an exemplary embodiment may take the form of a wireless signal repeater that includes, in a single device, (i) a wireless input circuit that receives a wireless input signal, the wireless input signal defining a receive signal strength, (ii) a build-out circuit for amplifying the wireless input signal and thereby producing a wireless output signal, the wireless output signal defining a transmit signal strength, (iii) a wireless output circuit that transmits the wireless output signal, (iv) a display screen, (v) data storage, (vi) a processor, and (vii) machine language instructions stored in the data storage and executable by the processor to perform a number of functions.

In this embodiment, the functions may include (a) performing a first comparison between the receive signal strength and a minimum receive threshold level, (b) performing a second comparison between the receive signal strength and a maximum receive threshold level, (c) performing a third comparison between the transmit signal strength and a maximum transmit threshold level, when the build-out circuit is set at the minimum gain, and (d) concurrently displaying on the display screen both a receive signal indicator and a transmit signal indicator.

In this arrangement, the receive signal indicator can reflect that the receive signal is insufficient (unacceptable, nonexistent, etc.) when the first comparison indicates that the receive signal strength is less than the minimum receive threshold level. Further, the transmit signal indicator can reflect that the transmit signal is insufficient (unacceptable, nonexistent, etc.) when the second comparison indicates that the receive signal strength is greater than the maximum receive threshold level. And the transmit signal indicator can reflect that the transmit signal is insufficient when the third comparison indicates that the transmit signal strength is greater than the maximum transmit threshold level.

And in yet another respect, an exemplary embodiment can take the form of a method that involves a single (unitary) device performing functions including (a) receiving a wireless input signal having a receive signal level, (b) producing a first signal that represents the wireless input signal, (c) amplifying the first signal so as to produce a second signal, (d) producing a wireless output signal that represents the second signal that has a transmit signal level, (e) transmitting the wireless output signal, and (f) displaying concurrently on a screen display, for viewing by a user, (i) an indication of the receive signal level and (ii) an indication of the transmit signal level. Further, this method can involve also concurrently displaying a textual indication of signal quality reflecting how well the repeater can function to repeat wireless signals.

These as well as other aspects and advantages of the exemplary embodiment will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
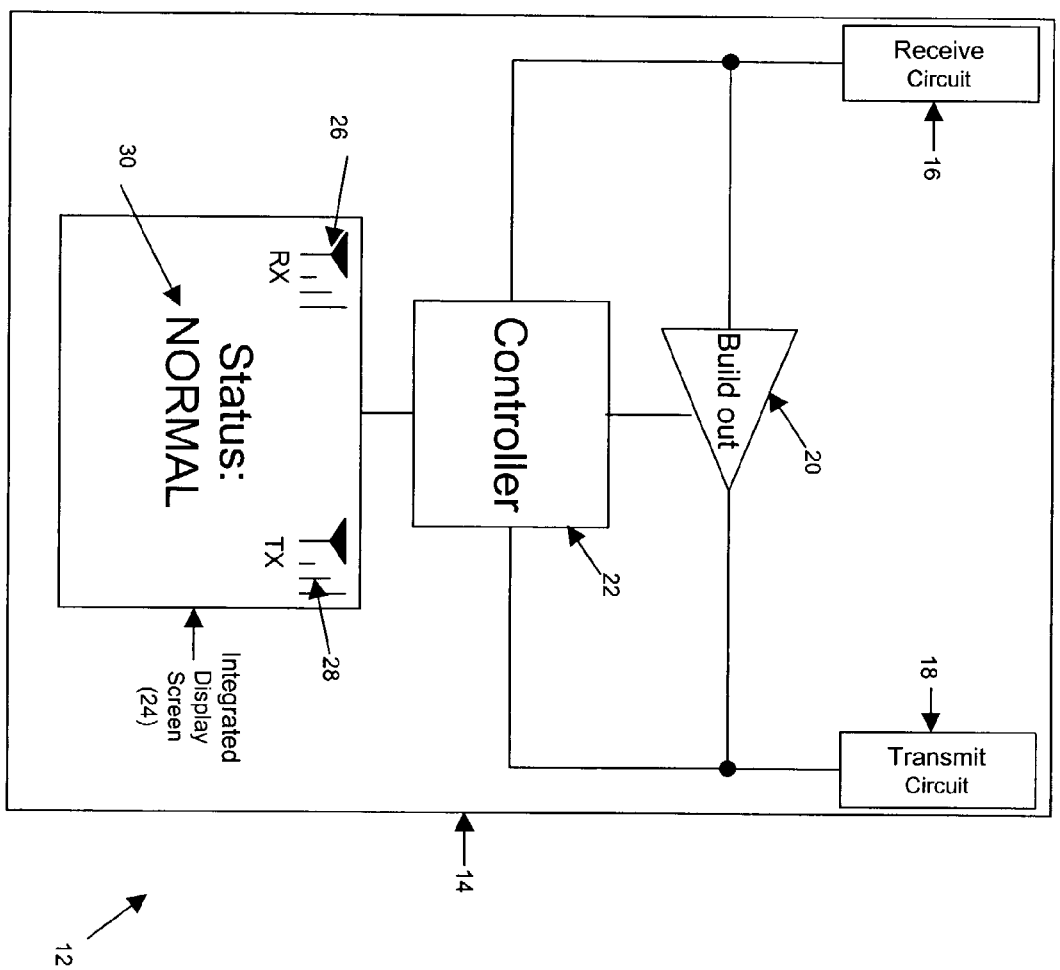
FIG. 1 is a simplified block diagram of an exemplary repeater.

Referring to the drawings, FIG. 1 is a simplified block diagram illustrating components of a wireless signal repeater 12 made in accordance with an exemplary embodiment of the invention. As shown in FIG. 1, repeater 12 preferably has an outer housing or case 14 in or on which various components are located. Illustrated within housing 14 are a receive circuit 16, a transmit circuit 18, a build-out circuit 20, a controller 22, and a display screen 24. In the arrangement shown, receive circuit 16 is coupled with an input of build-out circuit 20 and with controller 22, and transmit circuit 18 is coupled with an output of build-out circuit 20 and with controller 22. In addition, controller 22 is coupled with display screen 24.

Each of these components can take various forms. Therefore, particular descriptions of these components in this specification should be viewed as examples only. Further, the arrangement and functions of these components can vary, additional components could be added, and the functions of various components can be combined if desired.

In the exemplary embodiment, receive circuit 16, transmit circuit 18, build-out circuit 20 and controller 22 are all completely internal to housing 14. Display screen 24 may also be internal to housing 14 but preferably faces out from an outer surface of housing 14, so as to allow a user to view indications that are displayed on the screen.

Generally speaking, receive circuit 16 preferably comprises a receive antenna suitable for receiving wireless signals of a desired frequency or other character. And transmit circuit 16 preferably comprises a transmit antenna suitable for transmitting amplified wireless signals of the same frequency or character. Although these circuits are shown completely internal to housing 14, their respective antennas can additionally or alternatively extend outside of the housing if desired. In this regard, for instance, the repeater could include external antenna ports to facilitate connection with external antennas. Suitable antennas may include flat planar patch antennas and/or dipole antennas.

Build-out circuit 20, in turn, is preferably a variable gain amplifier, which can be set to amplify input signals (from receive circuit 16) to a desired extent, so as to produce output signals (for transmission by transmit circuit 18). As such, the build-out circuit may be configurable to provide a gain ranging from a minimum gain to a maximum gain.

Controller 22 may also take various forms. For instance, controller 22 may include a processor that is programmed to carry out various functions described herein, such as monitoring receive signal strength and transmit signal strength and controlling the build-out circuit and the display screen, so as to facilitate operation of the repeater and display of suitable indications on the display screen. Alternatively or additionally, the controller could be embodied in hardware or firmware of various sorts, such as a dedicated DSP or ASIC.

Display screen 24, in turn, be an LCD display panel or other type of display that can display RF status indications in response to control signals from controller 22. As illustrated in FIG. 1, three such indications are (i) a receive signal level 26, (ii) a transmit signal level 28, and (iii) a textual indication of signal quality 30, reflecting the state of RF operation of the repeater. Preferably, the display provides these three indications simultaneously, so that a user can see all three indications at once.

Note that the particular indications shown on the display in FIG. 1 are provided for example only. Other indications of various forms and content are possible as well. For instance, referring to FIGS. 2A–2D, four example displays are shown, reflecting four possible states of RF operation of the repeater. Once again, assorted variations on these four example displays are possible as well.

Figure 2A:
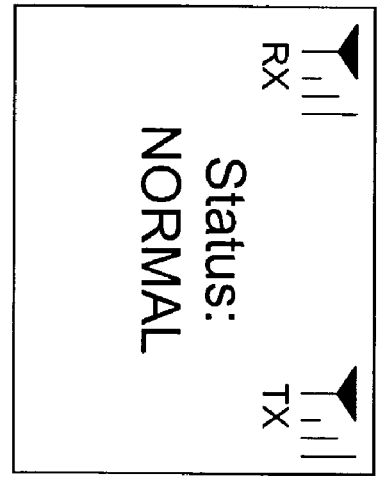
FIGS. 2A–2D are displays that may be presented on an integrated display screen of the exemplary repeater.

The display shown in FIG. 2A is the same as that shown in FIG. 1 and reflects normal operation of the repeater (i.e., operation within normal limits). The receive level 26 in this display reflects full receive signal strength, the transmit level 28 reflects a full transmit signal strength, and the textual indication 30 of signal quality reflects "NORMAL" operation. This combination of indications on the display indicates that the repeater is functioning normally, receiving, boosting and transmitting wireless signals as desired.

Figure 2B:
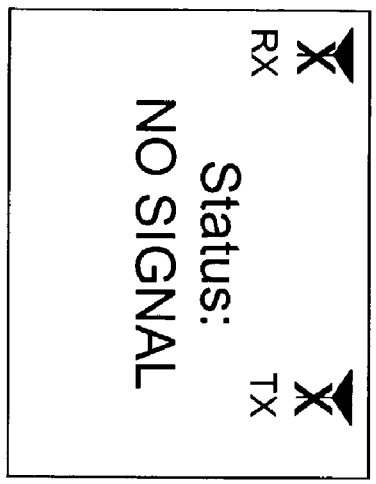

The display shown in FIG. 2B, in turn, reflects unacceptable operation of the repeater. In particular, the receive level 26 reflects insufficient receive signal strength (e.g., receive signal strength below a minimum threshold, or no input signal whatsoever) and insufficient transmit signal strength (e.g., transmit signal strength below a minimum threshold, or no output signal whatsoever). Further, the textual indication 30 reflects "NO SIGNAL." This combination of indications tells a user that the repeater is either receiving no input signal or that the input signal is so low that the repeater cannot function.

Figure 2C:
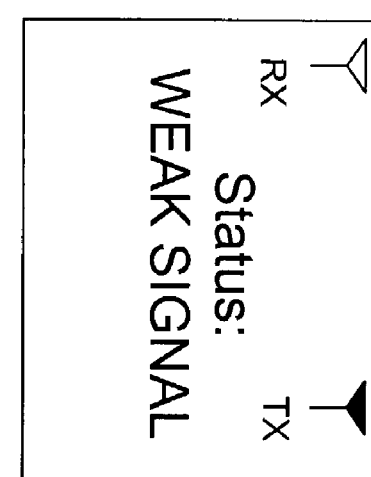

The display shown in FIG. 2C, next, reflects acceptable but weak performance of the repeater. As shown in this display, the receive level 26 reflects weak receive signal strength (e.g., below some threshold, but high enough to be resolved and repeated by the repeater), the transmit level 28 reflects an acceptable transmit signal strength, and the textual indication states "WEAK SIGNAL." This combination of indications tells the user that the repeater is functioning alright but not as well as it could.

Figure 2D:

In turn, the display shown in FIG. 2D reflects a scenario when the input signal is too strong to facilitate operation of the repeater (e.g., when the receive signal strength exceeds a defined threshold, or when the gain of the build-out circuit cannot be reduced enough to eliminate feedback oscillation that occurs when the receive antenna picks up signals transmitted by the transmit antenna.) In this scenario, the receive level reflects full receive signal strength, the transmit level reflects insufficient (e.g., nonexistent) transmit signal strength, and the textual indication states that the signal is "TOO STRONG." This combination of indications tells the user that the input signal is so high that the repeater cannot function.

Figure 3:
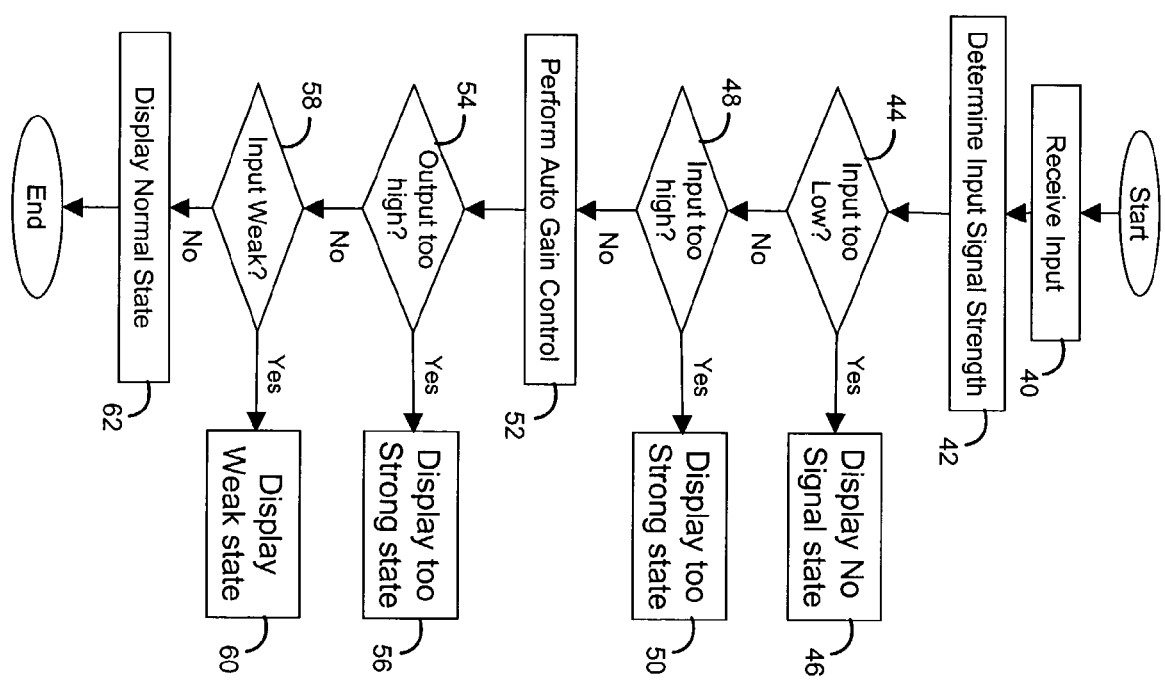
FIG. 3 is a flow chart of functions performed by the exemplary repeater.

In the exemplary embodiment, the controller can determine what indications to display on the display screen and can work to ensure proper operation of the repeater, by monitoring receive and transmit signal levels and by performing a set of threshold comparisons. FIG. 3 is a flow chart generally illustrating this process. Note that the particular form and order of functions shown in this figure is not necessarily limiting. For instance, threshold comparisons can be carried out in another order, in parallel, or in sub-steps. Other variations are possible as well.

As shown in FIG. 3, at block 40, receive circuit 16 receives a wireless input signal and passes the input signal to build-out circuit 20 and controller 22. (In operation, the receive circuit converts the RF input signal to a DC current and then passes the current, rather than the input signal, to the build-out circuit and controller; however, for simplicity, the signal can still be referred to as the input signal.)

At block 42, controller identifies a strength of the input signal. For instance, if the input signal is represented by a current, a current monitor (not shown in FIG. 1) could read the current amplitude (or the amplitude of a predetermined portion of the input signal) and pass a measure of that amplitude to the controller. Alternatively, the controller itself could measure he input signal strength.

At block 44, the controller then compares the input signal strength to a predefined minimum threshold for input signal strength, which could be the minimum level at which the repeater can resolve and build-out the signal. If the controller determines that the input signal strength is less than the minimum predefined threshold, then, at block 46, the controller directs the display screen to present the display shown in FIG. 2B, indicating that there is insufficient input to facilitate operation of the repeater. Otherwise, the process continues at block 48.

At block 48, the controller then compares the input signal strength to a predefined maximum threshold for input signal strength, which could be the maximum allowable input signal where the repeater can safely operate (e.g., to maximize life of the build-out circuit). If the controller determines that the input signal strength is more than the maximum predefined threshold, then, at block 50, the controller directs the display screen to present the display shown in FIG. 2D, indicating that the signal is too strong to facilitate operation of the repeater. Otherwise, the process continues at block 52.

At block 52, the controller then performs a process of automatic gain control (AGC), if necessary, to eliminate feedback oscillation. Generally speaking, when feedback oscillation occurs, the output signal will rise to an unacceptable level, due to signal reflections from the transmit antenna to the receive antenna. In the exemplary embodiment, the controller can detect the presence of feedback oscillation by determining whether the output signal strength is greater than a predefined threshold (such as −40 dBm, for instance) that is considered to indicate feedback oscillation. When the controller detects feedback oscillation, the controller can then reduce the gain of build-out circuit 20 in an effort to lower the output signal strength to below that predefined oscillation threshold. Preferably, the controller will lower the gain of the build-out circuit incrementally, until the output signal strength falls below the predefined oscillation threshold or until the controller reaches the minimum gain of the build-out circuit.

At block 54, the controller can then determine whether the output signal strength is too high, namely whether it still exceeds the predefined oscillation threshold, so that oscillation is still likely to be occurring. If the controller determines that the output signal strength is too high, then, at block 56, the controller directs the display screen to present the display shown in FIG. 2D, indicating that the signal is too strong to facilitate operation of the repeater. Otherwise, the process continues at block 58.

At block 58, the controller then determines whether the input signal strength is weak, albeit sufficient to facilitate operation of the repeater. To do this, the controller may compare the input signal strength to a predefined threshold considered to be "weak." If the controller determines that the input signal strength is weak, then, at block 60, the controller directs the display screen to present the display shown in FIG. 2C, indicating that the signal is weak, so that the repeater is functional but could do better. Otherwise, the process continues at block 62.

At block 62, having concluded that the input signal is not too low or too high, and that the output signal is not too high, the controller then directs the display screen to present the display shown in FIG. 2A, indicating that the repeater is functioning normally. In this display, the controller causes the receive and transmit level indicators to reflect the input and output signal strengths. In this regard, for instance, the controller could compare the input signal strength to predefined threshold ranges of input signal strength and can se the receive signal level indicator to include a number of bars reflecting the range in which the input signal strength falls. And similarly, the controller could compare the output signal strength to predefined threshold ranges of output signal strength and can set the transmit signal level indicator to include a number of bars reflecting the range in which the output signal strength falls.

For simplicity of operation, controller 22 may include or have access to a set of logic that establishes all of the threshold values described above. In the exemplary embodiment, the logic may take the form of lookup data, such as a logical array defined in program logic, or a stored table to which the controller can refer. The threshold values will likely depend on the particular design of the repeater and may therefore be set by the manufacturer. Generally speaking, for purposes of example, a minimum input threshold level might be −100 dBm, a "weak" input threshold level might be −96 dBm, a maximum input threshold level might be −40 dBm, and a maximum output threshold level (indicative of oscillation) might be 2 dB greater than the rated output power of the device. However, other examples are possible as well.

Figure 4:
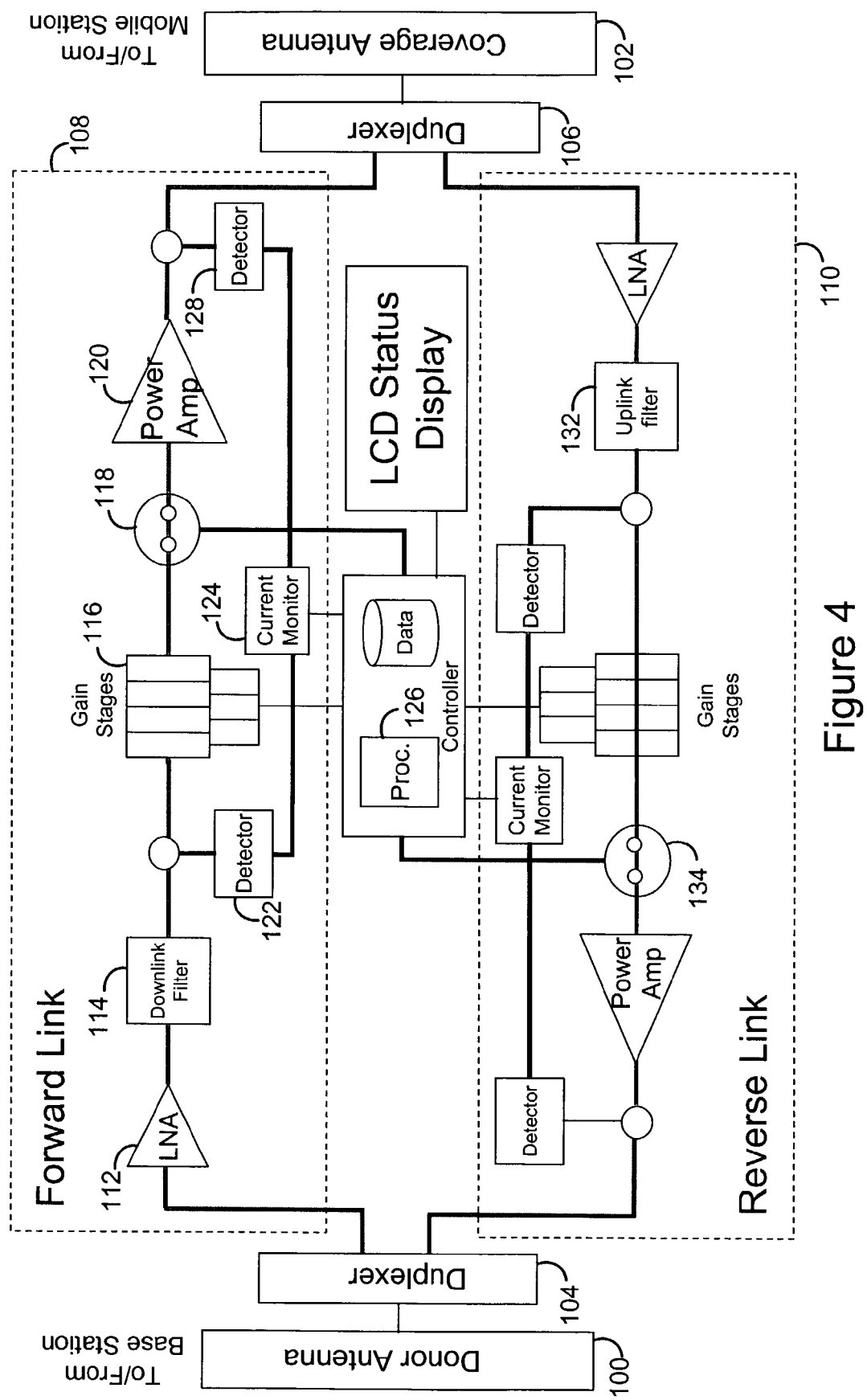
FIG. 4 is a more detailed schematic block diagram of the exemplary repeater.

Referring next to FIG. 4, a schematic of an exemplary repeater is shown, to illustrate in more detail how a repeater can be arranged to function in accordance with the exemplary embodiment. Although a housing is not shown in FIG. 4, it should be understood that the components shown in FIG. 4 will preferably reside in a single housing as described above. An exemplary housing can be made of a rugged molded plastic and can be approximately 2.2" W×3.6" H×2.2" D. However, other configurations are equally possible.

The exemplary arrangement shown in FIG. 4 depicts a donor antenna 100 for communicating signals with the base station, and a coverage antenna 102 for communicating signals with the mobile station. The repeater may then include duplexors 104, 106 for concurrently handling transmit and receive signals on each antenna. The repeater may then process forward link signals separately in a forward link block 108, and reverse link signals separately in a reverse link block 110.

In the exemplary embodiment, on the forward link, the donor antenna 100 will receive an RF signal, which will then pass through duplexor 104 to a low noise amplifier (LNA) 112. From LNA 112, the signal will then pass to a downlink (forward link) block filter 114, which functions to pass only a predefined part of the signal. For cellular wireless communications in the PCS bands, the filter could pass a frequency range such as about 1930 to 1990 MHz or about 1840 to 1870 MHz, though other examples are possible as well.

Substantially all of the output from the downlink filter then passes to a gain stage circuit 116 that is made up of a number of gain stages, each of which can be selectively applied to increase the signal. From the gain stage circuit, the signal then passes through a switch 118 to a power amplifier 120, which amplifies the signal. In turn, substantially all of the amplified signal then passes via duplexor 106 to the coverage antenna 102, which transmits an RF output signal to the mobile station.

In the arrangement shown, a portion of the output from downlink filter 114 passes through a coupler to a detector 122, which provides an RMS voltage reading to a current monitor 124. And the current monitor 124 then reads the current of the signal and passes the current reading to a controller 126, reflecting the input signal strength. Additionally, a portion of the output from power amplifier 120 passes through a coupler to a detector 128, which provides an RMS voltage reading to current monitor 124. And current monitor 124 then reads the current of that signal and feeds the current reading to controller 126, reflecting the output signal strength. Alternatively, note that separate current monitors could be provided for monitoring input and output signal strength.

Controller 126 is shown to include a processor and data storage. The data storage preferably holds a set of machine language instructions executable by the processor. Further, or as part of those instructions, the data storage defines various threshold levels of input and output signal strength as described above.

The controller is then coupled with gain stage circuit 116, so as to control the number of gain stages that are in effect at any given time. Thus, when the controller determines that the output signal strength exceeds a predefined oscillation threshold, indicative of feedback oscillation, the controller may incrementally reduce the amount of gain applied by the gain stage circuit 116, in an effort to eliminate that oscillation.

And the controller 126 is coupled with an LCD display screen 130, so as to display a receive signal level, a transmit signal level and a textual indication of signal quality as described above.

The reverse link block 110 in FIG. 4 may operate largely in the same manner as the forward link block, so it is not described in full here. One notable distinction is that the reverse link block includes an uplink (reverse link) block filter 132, rather than a downlink block filter. The uplink block filter functions to pass only a predefined part of the reverse link input signal. For cellular wireless communications in the PCS bands, the uplink filter could pass a frequency range such as about 1850 to 1910 MHz or about 1750 to 1780 MHz. Other example ranges are also possible.

In addition, in accordance with the exemplary embodiment, a mechanism can be provided in order to reduce the amount of noise that the repeater sends to the base station in scenarios where the repeater should not be sending any signal, such as when the input signal strength is too low or too high, or when the output signal strength is too high (reflecting feedback oscillation). This mechanism can be simply a switch that the controller can open in order to cut off transmission of substantially any output signal when desired. In the arrangement shown in FIG. 4, switch 134 serves this function.

When controller 126 determines that the input signal strength is too low (indicating that there is really no activity from a mobile station), the controller can open switch 134, so as to effectively stop transmission of noise to the base station. Once the controller then detects a sufficient input signal strength (indicating a legitimate signal from a mobile station), the controller can then close switch 134 again, so as to allow transmission to the base station. Advantageously, this should greatly reduce the amount of noise transmitted to the base station, particularly when a large number of repeaters are in operation at once.

Similarly, the controller can open switch 134 in other scenarios where the repeater is not supposed to be transmitting on the reverse link. For instance, the controller can open switch 134 so as to turn off transmissions when the input signal strength is too high. And, if output signal strength is instead measured before the signal passes to the switch, the controller can also open the switch so as to turn off transmissions when the output signal strength is too high (reflecting feedback oscillation).

FIG. 4 depicts a similar switch 118 on the forward link, which controller 126 can open similarly to cut off transmissions to the mobile station if desired.

An exemplary embodiment of the present invention has been described above. Those skilled in the art will understand, however, that changes and modifications may be made to this embodiment without departing from the true scope and spirit of the present invention, which is defined by the claims.

For instance, although the foregoing focuses mainly on transmissions between base stations and mobile stations as in a cellular wireless system (e.g., CDMA, TDMA, GSM, AMPS, etc.), the exemplary embodiment can be equally applied to help boost wireless communications of other sorts, such as communications according to the 802.11 wireless LAN protocol, and the Bluetooth recommendation, and cordless telephone communications. Other variations are possible as well.

I claim:

1. A method of controlling output from a wireless signal repeater, the method comprising:

comparing an input signal strength to a predefined minimum threshold;
cutting off transmission out of the repeater if the input signal strength is less than the predefined minimum threshold;
comparing the input signal strength to a predefined maximum threshold;
cutting off transmission out of the repeater if the input signal strength is more than the predefined maximum threshold;
comparing an output signal strength to a predefined oscillation threshold; and
cutting off transmission out of the repeater if the output signal strength exceeds the predefined oscillation threshold.

2. The method of claim 1, wherein the repeater normally receives an input signal defining the input signal strength and outputs an amplified representation of the input signal, and wherein cutting off transmission out of the repeater comprises cutting off transmission of the amplified representation of the input signal.

3. The method of claim 1, wherein cutting off transmission out of the repeater comprises opening a switch so as to cut off signal flow through the repeater.

4. In a wireless signal repeater of the type comprising a wireless input circuit, a build-out circuit and a wireless output circuit, wherein the repeater has an input signal strength reflecting strength of input to the wireless input circuit, wherein the build-out circuit includes an amplifier operable to receive a representation of the input signal and to amplify the representation so as to provide an amplified signal, wherein the wireless output circuit is operable to transmit a representation of the amplified signal, and wherein the repeater has an output signal strength reflecting strength of the amplified signal, a method of controlling output from the repeater, the method comprising:
comparing the input signal strength to a predefined minimum threshold;
cutting off transmission out of the repeater via the wireless output circuit if the input signal strength is less than the predefined minimum threshold;
comparing the input signal strength to a predefined maximum threshold;
cutting off transmission out of the repeater via the wireless output circuit if the input signal strength is more than the predefined maximum threshold;
comparing the output signal strength to a predefined oscillation threshold; and
cutting off transmission out of the repeater via the wireless output circuit if the output signal strength exceeds the predefined oscillation threshold.

5. The method of claim 4, wherein the repeater includes a switch, the switch having (i) a closed state in which a circuit path extends from the wireless input circuit through the wireless output circuit and (ii) an open state in which the circuit path is broken, and wherein cutting off transmission out of the repeater via the wireless output circuit comprises:
moving the switch from the closed state to the open state.

6. The method of claim 4, wherein cutting off transmission out of the repeater via the wireless output circuit comprises:
cutting off input to the amplifier.

7. The method of claim 6, wherein the repeater includes a switch that, when in a closed state, provides input to the amplifier and, when in a closed state, cuts off input to the amplifier, and wherein cutting off input to the amplifier comprises:
opening the switch.

8. The method of claim 5, wherein the input to the wireless input circuit comprises reverse link transmission from a mobile station to a base station.

9. The method of claim 8, wherein the reverse link transmission comprises a transmission selected from the group consisting of (i) a CDMA transmission, (ii) a TDMA transmission, (iii) a GSM transmission, (iv) an AMPS transmission, (v) an 802.11 transmission, (vi) a Bluetooth transmission and (vii) a cordless phone transmission.

10. The method of claim 5, wherein the input to the wireless input circuit comprises forward link transmission from a base station to a mobile station.

11. A wireless signal repeater comprising:
a wireless input circuit operable to receive an input signal, the input signal defining an input signal strength;
a build-out circuit operable to receive and amplify a representation of the input signal and to thereby produce an amplified signal, wherein the amplified signal defines an output signal strength;
a wireless output circuit operable to transmit a representation of the amplified signal; and
a controller operable to cut off transmission out of the repeater via the wireless output circuit (i) when the input signal strength is less than a predefined threshold,
(ii) when the input signal strength is more than a predefined maximum threshold, and (iii) when the output signal strength exceeds a predefined oscillation threshold.

12. The wireless signal repeater of claim 11, wherein the controller cuts off transmission out of the repeater via the wireless output circuit by opening a switch.

13. The wireless signal repeater of claim 12, wherein the build-out circuit includes an amplifier, and wherein opening the switch cuts off input to the amplifier.

14. The wireless signal repeater of claim 11, wherein the controller comprises a processor programmed with machine language instructions that cause the processor to compare the input signal strength to the predefined minimum threshold and to the predefined maximum threshold and to compare the output signal strength with the predefined oscillation threshold.

15. The wireless signal repeater of claim 11, wherein the input signal comprises reverse link transmission from a mobile station to a base station.

16. The wireless signal repeater of claim 11, wherein the reverse link transmission comprises a transmission selected from the group consisting of (i) a CDMA transmission, (ii) a TDMA transmission, (iii) a GSM transmission, (iv) an AMPS transmission, (v) an 802.11 transmission, (vi) a Bluetooth transmission and (vii) a cordless phone transmission.

17. The wireless signal repeater of claim 11, wherein the input signal comprises forward link transmission from a base station to a mobile station.

18. A wireless signal repeater that operates as in claim 11 in both a reverse link direction and a forward link direction.

* * * * *